June 30, 1942.  E. W. VREDENBURG  2,288,379
WEIGHING MECHANISM FEEDER
Filed Dec. 31, 1940
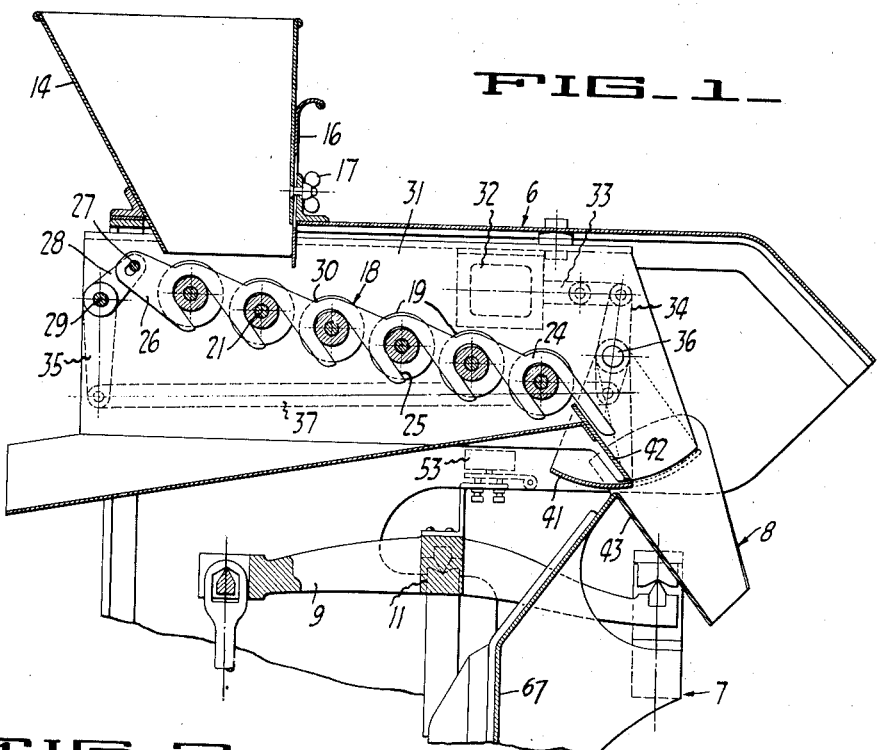
FIG_1_
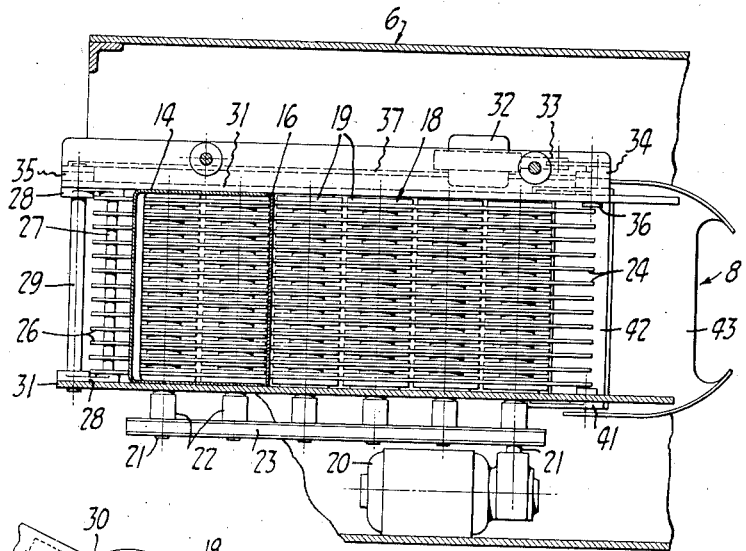
FIG_2_
FIG_3_
INVENTOR
Edric. W. Vredenburg
BY Robert H. Eckhoff
ATTORNEY Patented June 30, 1942

2,288,379

UNITED STATES PATENT OFFICE 2,288,379

WEIGHING MECHANISM FEEDER

Edric W. Vredenburg, Oakland, Calif.

Application December 31, 1940, Serial No. 372,457

10 Claims. (Cl. 221—118)

This invention relates to a feeder structure, particularly one to be employed in conjunction with a weighing mechanism. In the bulk handling of such produce as prunes, dried apples, dried apricots, nuts, raisins, beans and the like, considerable difficulty is occasioned in feeding these materials to a suitable weighing mechanism adapted to weigh out batches of the product. This will be appreciated when it is remembered that the unit weight of any one of these products is relatively high as compared to other materials, sugar for example. Further, dried fruits do not flow readily, being more or less sticky. The feeder of the present invention enables positive control to be maintained over the product being fed to the weighing mechanism in a simple and yet very effective manner.

It is usual in weighing mechanisms to provide a main or bulk feed and, as the selected weight is approached, to reduce the feed rate and merely "dribble" the material into the weighing mechanism to complete the batch. The feeder of the present invention enables a suitable dribble feed to be made with such large bulk materials as those previously mentioned.

The invention includes other objects and features of advantage, some of which, together with the foregoing, will appear hereinafter wherein the preferred form of feeder of this invention is disclosed.

In the drawing accompanying and forming a part hereof, Figure 1 is a side elevation partly in section, showing the feeder mechanism of the present invention; Figure 2 is a plan view of the feeder, partly in section; and Figure 3 is a fragmentary side elevation.

The feeder of the present invention is usually mounted upon and suitably supported by a frame generally indicated at 6 of a suitable weighing mechanism generally indicated at 7. As appears in Figure 1, I have indicated a receptacle support structure 8 suitably supported by a weighing frame generally indicated at 9 and supported on the pivot blocks 11. This weighing mechanism is adapted to receive a charge of a selected weight, movement of the mechanism controlling the delivery of material to the weighing mechanism so that the mechanism is effective to control the feeder operation to the end that the feeder discharges into the weigher a predetermined weight of material. This will be more fully explained hereinafter.

Material to be weighed is discharged into a suitable hopper 14, usually made of sheet metal and suitably mounted on the frame. A movable gate 16 controlled by wing nut 17 is mounted on the side of the hopper and controls the rate of discharge of the material into the feeder generally indicated at 18.

The feeder 18, in accordance with the present invention, includes a plurality of circumferentially grooved rolls 19 mounted in a side by side relationship with the upper surfaces of the rollers extending substantially in a common plane, this plane preferably extending downwardly away from hopper 14. Each roll includes a drive shaft 21 on which is mounted a suitable gear sprocket 22 adapted to be driven by a chain 23 common to the rolls so that all the rolls rotate in the same direction, that is, clockwise in Figure 1. A speed of about 40–80 R. P. M. usually suffices, about 60 R. P. M. for a two inch roll usually sufficing. The chain is driven from a suitable power source 20.

Mounted upon the rolls in the grooves are a plurality of longitudinally extending members 24, the members being angularly slotted as at 25 for support by the rolls. Each member extends along and lies in a series of aligned grooves. The members 24 are spaced together sufficiently close to support the product handled; this can vary over wide limits, depending on the product. Each longitudinal member includes an extending ear 26 thereon engaged with a rod 27 extended between levers 28. A shaft 29 is extended between side plates 31 to the levers 28. The shaft 29 is rocked by energization of a solenoid 32 having a plunger 33 connected to a lever 34. This lever is rotatably mounted on a pin 36; it is connected by a link 37 to a lever 35 secured to shaft 29. Energization of the solenoid and resulting movement of its plunger to the left in Figure 1 is effective to raise the longitudinal members from the feeding position in which they appear in Figure 1 (the dotted line position of Figure 3) to a raised position as in Figure 3 in which they extend above the plane of the rollers and in which they are effective to maintain material from engagement with the rollers and thus enable control to be maintained over material supplied from hopper 14. To assist in this, each member 24 is provided with an arcuate step or notch 30 adjacent each roll. When the members 24 are raised, the produce is retained in the notches out of contact with the rolls. As appears in the drawing, the notches 30 are formed by the junction of an arcuate portion and a straight portion on each longitudinal member.

Normally the plane of the rollers inclines downwardly toward the hopper. To ensure that further control is maintained over the material I preferably provide a movable discharge gate 41 adjacent the discharge end of the feeder, this gate being suitably formed and movable from a position, as in Figure 1, beneath discharge lip 42 into the dotted line position wherein it retains the material and the material cannot pass down chute 43. The gate is mounted on pivots 36 and secured to lever 34 which, as previously explained, is moved by the solenoid 32.

In operation, a suitable switch structure indicated at 53 is provided cooperatively adjacent to the weighing frame and in such relation thereto that the switch can effectively control operation of the solenoid 32. This switch is preferably the so-called "Micro-switch" structure particularly shown in Patent No. 2,112,977 of April 5, 1938.

When the scale platform is unloaded, the circuit through the switch is opened and the solenoid de-energized. When the frame moves downwardly to loaded position, the switch element is closed, the circuit closed thereby, and the solenoid energized and feed interrupted by raising the longitudinal members and rocking gate 41 counterclockwise in Figure 1.

The weighing frame includes a spout 43 to direct material into a bag or other receptacle carried on a suitable platform, not shown, supported by member 67 secured to the scale platform. The bag can thus fit closely adjacent to the discharge chute 8 and the material in suspension during the batch weighing is minimized.

I claim:

1. A device of the character described comprising a hopper for a supply of material, a plurality of rolls arranged in a side by side relationship beneath said hopper with the upper surfaces of said rolls in substantially a common plane, each roll having a plurality of circumferential grooves formed therein, the grooves in one roll being aligned with those in adjacent rolls, means for rotating said rolls in the same direction, and a plurality of members extending in the direction of said grooves and movable from a position below said plane to a position substantially above said plane.

2. A device of the character described comprising a hopper for a supply of material, a plurality of rolls arranged in a side by side relationship beneath said hopper with the upper surfaces of said rolls in substantially a common plane, each roll having a plurality of circumferential grooves formed therein, the grooves in one roll being aligned with those in adjacent rolls, means for rotating said rolls in the same direction, and a plurality of members supported by said grooved rolls, and means for moving said members in said grooves from a position below said plane to a position substantially above said plane.

3. A device of the character described comprising a hopper for a supply of material, a plurality of rolls arranged in a side by side relation beneath said hopper with the upper surfaces of said rolls in substantially a common plane, each roll having a plurality of circumferential grooves formed therein, the grooves in one roll being aligned with those in adjacent rolls, means for rotating said rolls in the same direction, a plurality of members extending across said grooves and movable in said grooves from a position below said plane to a position substantially above said plane, and a gate movable to control discharge of materials off said rolls.

4. A device of the character described comprising a plurality of rolls arranged in a side by side relation with the upper surfaces of said rolls in substantially a common plane, each roll having a plurality of circumferential grooves formed therein, the grooves in one roll being aligned with those in adjacent rolls, means for rotating said rolls in the same direction, and a plurality of members notched adjacent each roll and fitting in said grooves and extending in the direction of said plane and cooperatively adjacent the upper surfaces of said rolls, and means for moving said members in said grooves from a position below said plane to a position substantially above said plane to retain material supported by said members.

5. A device of the character described comprising a hopper for a supply of material, a plurality of rolls arranged in a side by side relation beneath said hopper with the upper surfaces of said rolls in substantially a common inclined plane, each roll having a plurality of circumferential grooves formed therein, the grooves in one roll being aligned with those in adjacent rolls, means for rotating said rolls in the same direction, and a plurality of members supported by said grooved rolls, and means for moving said members from a position below said plane to a position substantially above said plane.

6. A device of the character described comprising a hopper for a supply of material, a plurality of grooved rolls arranged in a side by side relation beneath said hopper with the upper surfaces of said rolls in substantially a common inclined plane, means for rotating said rolls in the same direction, and a plurality of members notched adjacent each roll and fitting in said grooves and extending in the direction of said plane and cooperatively adjacent the upper surfaces of said rolls, and means for moving said members from a position below said plane to a position substantially above said plane to retain material supported by said members.

7. A device of the character described comprising a plurality of grooved rolls arranged in a side by side relation with the upper surfaces of said rolls in substantially a common plane, each roll having a plurality of circumferential grooves formed therein, the grooves in one roll being aligned with those in adjacent rolls, means for rotating said rolls in the same direction, a plurality of members extending across said grooved rollers with a member fitting in each series of aligned grooves and movable from a position below said plane to a position substantially above said plane, a gate movable to control discharge of materials off said rolls, and a common operator for moving said member and said gate.

8. A device for controllably feeding solid materials comprising a roll positioned for rotation about a substantially horizontal axis, said roll having a plurality of circumferential grooves formed in the surface thereof, means for rotating said roll about said axis, means for feeding solids to said roll, and a plurality of fingers, each of said fingers being adapted to extend into one of said grooves and to lift a solid from contact with said roll.

9. A feeding device as in claim 8 wherein the width of the grooves is materially less than the smallest dimension of any one of the solids fed to said roll.

10. A device for controllably feeding solid materials comprising a roll positioned for rotation about a substantially horizontal axis, said roll having a plurality of circumferential grooves formed in the surface thereof, means for feeding solids to said roll, a plurality of fingers, each of said fingers being adapted to extend into one of said grooves and to lift a solid from contact with said roll, and means for moving said fingers and said roll with respect to each other to control feeding by said roll.

EDRIC W. VREDENBURG.